United States Patent
Paya et al.

(10) Patent No.: US 7,293,034 B2
(45) Date of Patent: Nov. 6, 2007

(54) DYNAMICALLY CUSTOMIZING A USER INTERFACE FOR THE AGGREGATION OF CONTENT

(75) Inventors: Ismail Cem Paya, Seattle, WA (US); Gilbert M. McQuillan, Seattle, WA (US)

(73) Assignee: Microsoft Coporation, Redmond, WA (US)

( * ) Notice: Subject to any disclaimer, the term of this patent is extended or adjusted under 35 U.S.C. 154(b) by 497 days.

(21) Appl. No.: 10/784,694

(22) Filed: Feb. 23, 2004

(65) Prior Publication Data

US 2005/0187895 A1 Aug. 25, 2005

(51) Int. Cl.
*G06F 17/30* (2006.01)

(52) U.S. Cl. .................... 707/101; 707/7; 707/104.1

(58) Field of Classification Search ............ 707/2, 707/3, 100, 104, 1; 715/500, 900
See application file for complete search history.

(56) References Cited

U.S. PATENT DOCUMENTS

| | | | |
|---|---|---|---|
| 5,959,621 A | | 9/1999 | Nawaz et al. |
| 6,065,024 A | | 5/2000 | Renshaw |
| 6,278,448 B1 | | 8/2001 | Brown et al. |
| 6,356,908 B1 | | 3/2002 | Brown et al. |
| 6,745,238 B1 | * | 6/2004 | Giljum et al. ............... 709/219 |
| 6,769,010 B1 | * | 7/2004 | Knapp et al. ............... 709/203 |
| 6,772,208 B1 | | 8/2004 | Dutta |
| 6,950,983 B1 | * | 9/2005 | Snavely ...................... 715/513 |
| 7,058,671 B2 | * | 6/2006 | Calvo et al. ............. 715/501.1 |
| 7,103,642 B1 | * | 9/2006 | Chen et al. .................. 709/218 |
| 2001/0032182 A1 | | 10/2001 | Kumar et al. |
| 2002/0095605 A1 | | 7/2002 | Royer et al. |
| 2002/0120567 A1 | | 8/2002 | Caplan et al. |
| 2002/0194501 A1 | | 12/2002 | Wenocur et al. |
| 2003/0023598 A1 | | 1/2003 | Janakiraman et al. |
| 2003/0177265 A1 | | 9/2003 | Page et al. |
| 2003/0191816 A1 | | 10/2003 | Landress et al. |
| 2004/0015476 A1 | * | 1/2004 | Twaddle ........................ 707/1 |

(Continued)

FOREIGN PATENT DOCUMENTS

WO 0221749 A2 3/2002

OTHER PUBLICATIONS

.NET Passport Cobranding Overview, Microsoft .NET Passport SDK, available at http://msdn.microsoft.com/library/en-us/passport25/NET_Passport_VBScript_Documentation/Single_Sign_In/Cobranding/cobrandtemplate.asp, printed on Dec. 5, 2003, 4 pages, Microsoft Corporation, U.S.A.

*Primary Examiner*—Tim Vo
*Assistant Examiner*—Dangelino Gortayo
(74) *Attorney, Agent, or Firm*—Senniger Powers (57) ABSTRACT

Enabling dynamic aggregation of content from a plurality of content providers. The invention stores references associated with specific display areas in a document for a particular data source. Responsive to a request for the document, the invention retrieves the references associated with the data source and dynamically inserts the references into the appropriate display area of the document. A client renders the document by obtaining the content associated with the references. In an embodiment, the invention includes a web service for cobranding a login user interface for a user authentication system. The web service places cobranding content provided by an affiliate content provider and sign-in user interface content provided by a user authentication service into different frames of a single web page.

29 Claims, 8 Drawing Sheets

U.S. PATENT DOCUMENTS

2004/0111424 A1* 6/2004 Roman et al. .............. 707/100
2004/0143667 A1* 7/2004 Jerome ...................... 709/228
2005/0216771 A1 9/2005 Malcolm

* cited by examiner

DYNAMICALLY CUSTOMIZING A USER INTERFACE FOR THE AGGREGATION OF CONTENT

TECHNICAL FIELD

Embodiments of the present invention relate to the field of user interfaces. In particular, embodiments of this invention relate to the dynamic aggregation of content from multiple content providers into separate display areas in a user interface.

BACKGROUND OF THE INVENTION

Existing web pages use frames to separate the display of content in a web browser. The web pages are statically defined in that associations between the content and the appropriate frame are hard-coded into the definition of the web page. For example, a reference (e.g., a hyperlink) to a table-of-contents may be associated with a frame on the left side of the web page while a reference to a particular chapter may be associated with a frame on the right side of the web page. A web browser renders the web page by retrieving and displaying the table-of-contents in the left side frame and retrieving and displaying the particular chapter in the right side frame.

Altering the web page for another use requires manual intervention. For example, an administrator may wish to use the layout as described in the above example for a parts catalog. The administrator wants to display a list of parts in the left side frame and a specific part in the right side frame. The administrator has to manually edit the web page from the above example to remove the existing references to the table-of-contents and to the particular chapter and add the references to the list of parts and to the specific part. The existing systems fail to enable the dynamic insertion of references into a web page.

Accordingly, a system for dynamically generating a web page with specified references is desired to address one or more of these and other disadvantages.

SUMMARY OF THE INVENTION

Embodiments of the invention enable the dynamic generation of a document for aggregating content from a plurality of content providers. In an embodiment, the invention includes defining for a particular content provider a document having a plurality of display areas, receiving at least one content reference from a content provider, and associating the received reference with a display area identifier related to at least one of the plurality of display areas in the defined document. The embodiment of the invention further stores the associated reference, the display area identifier, and a content provider identifier associated with the content provider in a memory area. Responsive to a request from the particular content provider including the content provider identifier, the embodiment of the invention accesses the memory area to retrieve the stored reference and display area identifier. The embodiment of the invention inserts the retrieved reference into the document based on the retrieved display area identifier and sends the document with the inserted reference to the content provider or directly to a user.

In accordance with one aspect of the invention, a method includes defining a web page having a plurality of frames. The method further includes receiving a hyperlink from a content provider. The hyperlink identifies content associated with the content provider. The content provider has a content provider identifier associated therewith. The method also includes associating the received hyperlink with a frame identifier related to one of the plurality of frames in the defined web page. The method further includes storing the associated hyperlink, the frame identifier, and the content provider identifier in a memory area.

In accordance with another aspect of the invention, one or more computer-readable media have computer-executable components. The components include a template component, an interface component, and a memory component. The template component defines a document having a plurality of display areas. The interface component receives a reference from a content provider. The reference identifies content. The content provider has a content provider identifier associated therewith. The interface component associates the received reference with a display area identifier related to at least one of the plurality of display areas in the document defined by the template component. The memory component stores the reference, the display area identifier, and the content provider identifier in a memory area.

In accordance with yet another aspect of the invention, a system enables the dynamic aggregation of content from a plurality of content providers. The system includes a first memory area to store a document defining a plurality of display areas. The system also includes a second memory area to store a plurality of references each identifying content associated with a content provider. Each of the plurality of references is associated with one of the plurality of display areas in the document stored by the first memory area. The system also includes a computing device to dynamically insert each of the plurality of references stored in the second memory area into the associated display area of the document stored in the first memory area responsive to a request for the document.

In accordance with still another aspect of the invention, a web service provides a cobranded login user interface. The web service includes a web page defining a plurality of frames. The web service also includes a plurality of hyperlinks each identifying content associated with a content provider. Each of the plurality of hyperlinks is associated with one of the plurality of frames defined in the web page. The content for one of the plurality of hyperlinks includes a user name text box and a password text box. The web service further includes computer-executable instructions to dynamically insert each of the plurality of hyperlinks into the associated frame in the web page responsive to a request for the web page.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

A portal web site offers computer-based services, such as e-mail, instant messaging, calendar, and portfolio tracking, and routes a user to affiliated web sites for performing the desired services. Users need to register at certain web sites to access services. Centralized password registration services enable a user to register at one place to access many sites. When a user subsequently visits a web site for which the user has registered, the web site performs user authentication. Although presently available multi-site user authentication systems or login services permit a web user to maintain a single login identifier and associated password for accessing multiple affiliated web servers or services, further improvements are desired.

Part of the typical process for authentication involves collecting credentials from the user. One approach for collecting credentials includes a web-based interface using hypertext markup language (HTML), hosted by the same web property operating the login service. One of the usability problems in some multi-site user authentication systems is the conceptual disconnect between the task that the user is trying to accomplish and the authentication process. For example, a user may be trying to access electronic mail at an electronic mail service, but clicking on a sign-in button takes the user out of this flow and into a page controlled by an authentication service. Such discontinuity in the user experience may lead to confusion. In addition to credential collection, other aspects of identity-management such as registering for a new account, password change, and editing data in user profile may be cobranded. The user may be more likely to proceed with an initial sign-in or registration process if the user can identify a connection with a known site and, thus, verify the implicit trust between affiliate and authentication web sites.

To avoid this problem, previous systems employed "cobranding" in which affiliated sites customize elements of the user experience associated with authentication. Presently available techniques for web sites to aggregate content (e.g., cobranding) between the sites require one site to physically host elements for the affiliated site. The hosting site must then render these elements from the centralized location. For services, which have many affiliates with diverse needs, the infrastructure needed to support such cobranding is extensive and costly to maintain. Inasmuch as conventional cobranding calls for the affiliate content to be maintained at the central site, affiliate sites also lack control and flexibility with respect to their cobranding elements. The prior systems also lack support for more advanced style features. Previous cobranding designs display the content from all data sources in a single frame in the web browser.

Some previous cobranding implementations also created a security vulnerability. The prior systems also display the content from all data sources in a single frame in the web browser that allows malicious content from the data sources to interact with other content in the frame. These prior systems execute a script in a web page aggregating the content to include content from an affiliate. Executing the script places unverified HTML content (e.g., active content such as JAVASCRIPT) from the affiliate in a web page. Scripting allows malicious interaction in the web page between content from different sources. For example, scripting allows a malicious or compromised affiliate to interfere with data collection by another web site by harvesting credentials, profile information, or credit card information from content associated with another affiliate.

Embodiments of the invention enable the dynamic aggregation of content from a plurality of content providers into a single document while maintaining separation between the content from different content providers. For example, a system according to an embodiment of the invention permits an affiliated site to dynamically insert its own branding elements and messaging with the centralized interfaces, or pages, provided by the multi-site user authentication system. This is referred to generally as cobranding and allows a web site to provide a consistent look and feel to the user even though the user has been routed from one site to another site to obtain a service (e.g., sign in, e-mail, calendar, etc.). The invention provides cobranding between affiliates while eliminating the need for extensive infrastructure at a central location for physically hosting elements for the other sites.

Distributed cobranding in this manner permits a centralized service to be seamlessly integrated with one or more affiliate services by dynamically inserting branding elements and messaging with the centralized pages. Cobranding allows affiliate websites partial control over the user interface of another web service to create a relatively seamless transition between affiliate websites when a user is directed between sites to complete a task such as authentication. Cobranding according to embodiments of the invention further provides flexibility to affiliates that want their brand and look-and-feel to be visible to the user during various operations or tasks (e.g., login).

Moreover, embodiments of the invention permit more advanced style features such as nested frames or customization functions (e.g., cascading style sheets). Rather than merely displaying the content from all data sources in a single frame in the web browser, aspects of the invention involve allowing third parties to author HTML content to be rendered in separate frames in a web browser to improve security.

In one embodiment, references (e.g., hyperlinks) to content from each content provider are dynamically inserted into a top-level document (e.g., a template document). A web site according to the invention stores the references to the content in a database. Responsive to a user request, the references are retrieved from the database and inserted into the top-level document dynamically. The invention determines which references to retrieve from the database using query string parameters (e.g., CBID, ID, or a default identifier, in that order) in the user request.

The invention in this embodiment renders a participating site's cobranding content in its own frame (or frames) via references such as hyperlinks. The content may include, but is not limited to, JAVASCRIPT, applets, and hypertext markup language (HTML) form controls. Also, because the content for each frame is loaded independently, each frame may use its own style sheet or background image. Further, code executing in one frame cannot access the contents of another frame unless the access attempt satisfies a security policy. For example, the security policy may include a comparison of the references of each frame involved in the access attempt to determine if the references are directed to the same content provider or web site. In this manner, two frames from the same web site may interact.

Further, the HTML seen by the user is exactly the HTML provided in the cobranding file. These features expand the flexibility of cobranding while greatly easing the time and effort needed to develop and debug cobranding content.

In an embodiment, the invention includes a web service for cobranding a login user interface for a user authentication system. The web service places cobranding content provided by an affiliate content provider and sign-in user interface content provided by a user authentication service into separate and different frames of a single web page. In one embodiment, the use of hypertext markup language (HTML) frames in a web browser achieves content separation and independence and prevents cross-domain access between frames so that content from one affiliate content provider cannot access content from another affiliate content provider. Another aspect of the invention allows each cobranded frame to specify its own encoding instead of formatting all cobranding content using the same character encoding as the login user interface. Specifying the encoding per frame increases the variety of content types to be aggregated in a single document.

Another aspect of the invention further provides security under various attack scenarios while maintaining superior flexibility (e.g., supporting many HTML features) and enabling the aggregation of unverified content from multiple content providers. In an embodiment, the invention provides a cobranding service that is secure against several attacks including, but not limited to, a man-in-the-middle attack against the user and an attack involving a compromised affiliate content provider serving malicious content. Embodiments of the invention meet the cobranding needs of affiliated sites, minimize the burden of hosting content at a centralized site, improve the security of cobranded pages, eases the development and debugging of cobranding content, enable flexible internationalization of cobranding, and are compatible with existing web browsers.

Cobranding with Frames

Figure 1:
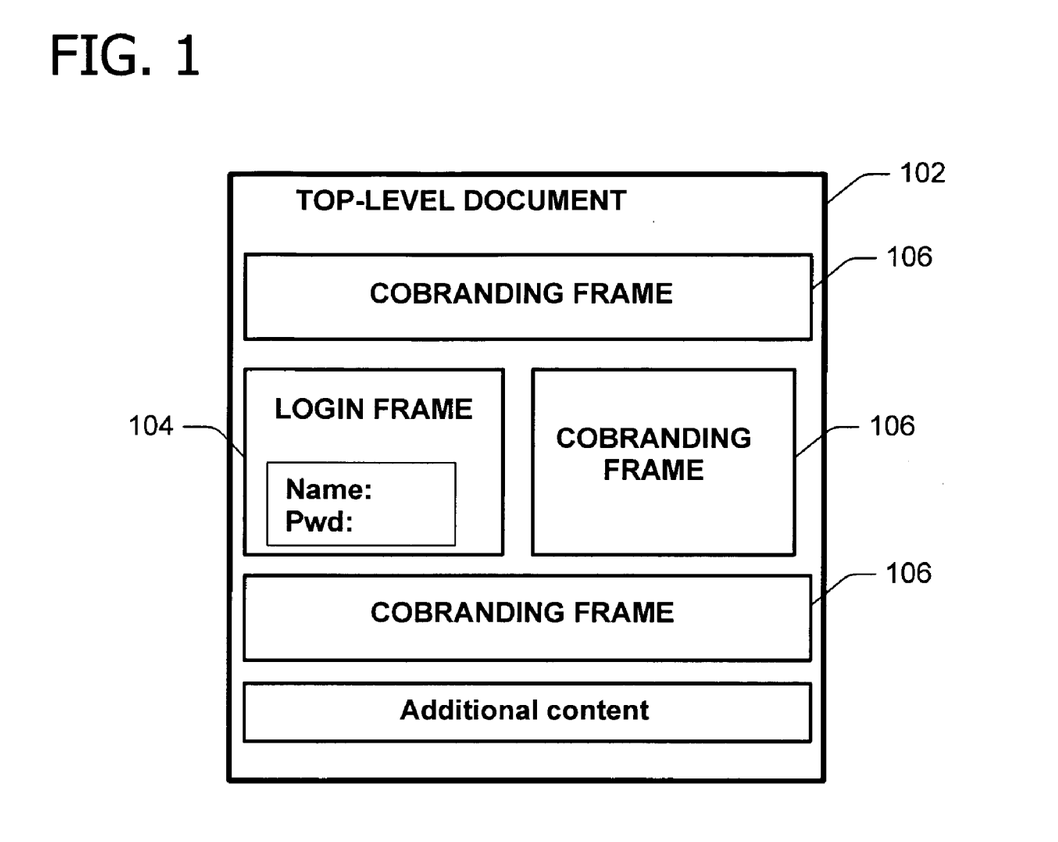
FIG. 1 is an exemplary embodiment of a cobranded document.

Referring first to FIG. 1, an exemplary embodiment of a cobranded document is shown. In this example, a top-level document 102 such as a web page defined by an extensible markup language template (XML) file displays a cobranded login user interface. In one embodiment, the top-level document is a self-contained piece of work created and saved as a file and a template is a specific example of a document. The web page, when loaded, displays a frameset containing multiple inline frames (e.g., iframes) as defined by the XML template file. The XML template file includes frameset dimensions and properties of the login frame. The appearance of a login frame 104 is modifiable via the XML template file.

The inline frameset isolates content from the various data sources. One of these frames includes the login frame 104 displaying user name and password fields. The content for the login frame 104 is obtained from a user authentication service. The cobranding frames 106 may include, for example, a participating web site's cobranding content that is loaded from the web site's server. The frames 104, 106 and frame fragments are downloaded in parallel in one web browser implementation via a protocol such as hypertext transfer protocol secure (HTTPS).

Figure 2:
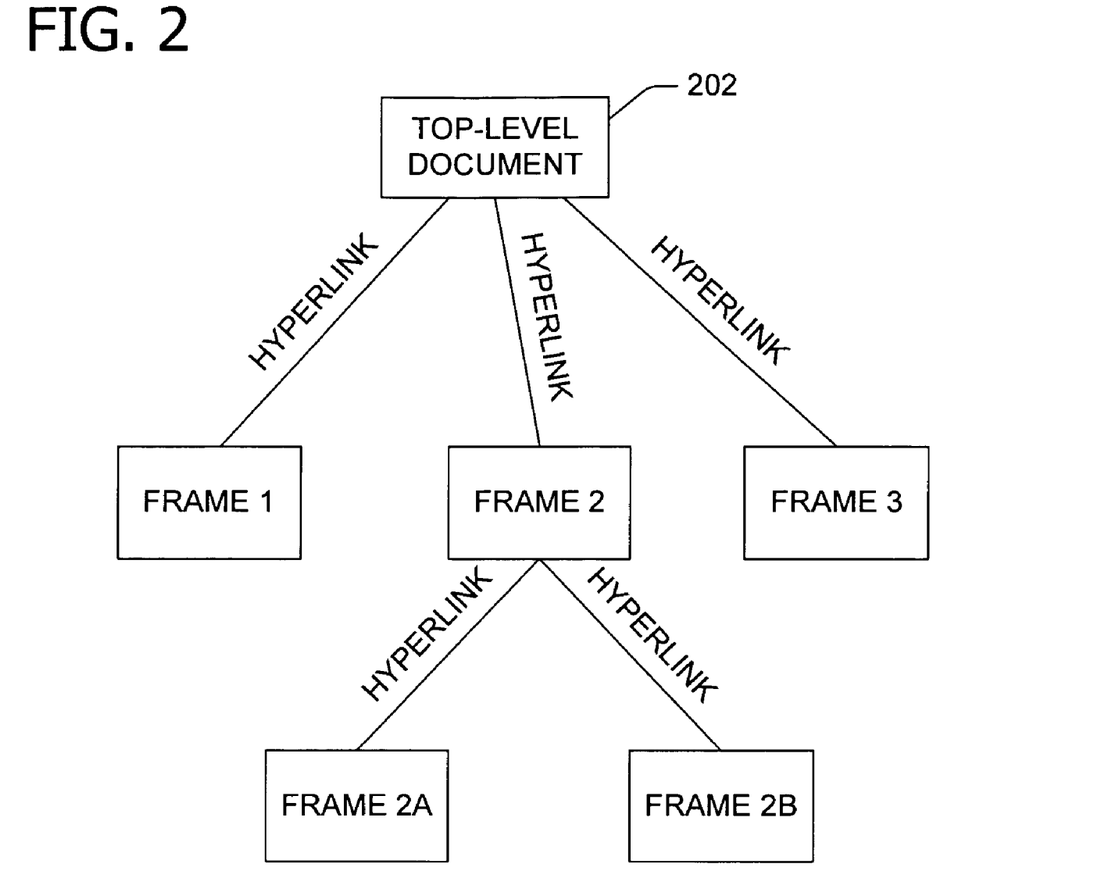
FIG. 2 is a block diagram illustrating the relationship between a hypertext document and frames therein.

Referring next to FIG. 2, a block diagram illustrates the relationship between a hypertext document and frames therein. A top-level document 202 such as top-level document 102 includes references such as hyperlinks to multiple frames (e.g., cobranding frames) such as frames 1, 2, and 3. Frame 2 may include references to other frames such as frames 2A and 2B. The functionality and operation of web browser frames are well known in the art.

The content of the cobranding frames is stored in one or more files hosted by the participating web site. The participating web site has control over the format (e.g., colors and fonts) and data (e.g., text, graphics, audio, and video) included in these files including the use of cascading style sheets (CSS), scripting, and other elements such as applets or form controls. A participating web site specifies character encoding and incorporates images, graphic elements, and text to surround the login frame and make the web page blend into the graphical scheme of the rest of the web site. The participating web site also has a limited ability to manipulate the appearance of the login frame to further improve the flow of the sign-in experience. In one embodiment, an inheritance mechanism enables the participating web site to inherit some or all of the properties of the top-level document or other containing frame. For example, properties that may be inherited include, but are not limited to, style properties such as color, font, and character encoding.

In a web browser embodiment, the invention provides backwards compatibility for web browsers, support for inline and regular frames depending on browser version, navigation buttons such as backward and forward buttons, explicit links in HTML for navigating backward and forward, and event handlers for script navigation. The invention prevents the harvesting of user-credentials or profile data assuming that the underlying protocols such as secure sockets layer are cryptographically secure and that the client web-browser is secure. The strict frame layout assigns each frame a specific location, size and z-index for controlling background versus foreground rendering on the page. Further, the invention may register an event handler on the top-level document that is triggered on navigation to further ensure separation of content.

Figure 3:
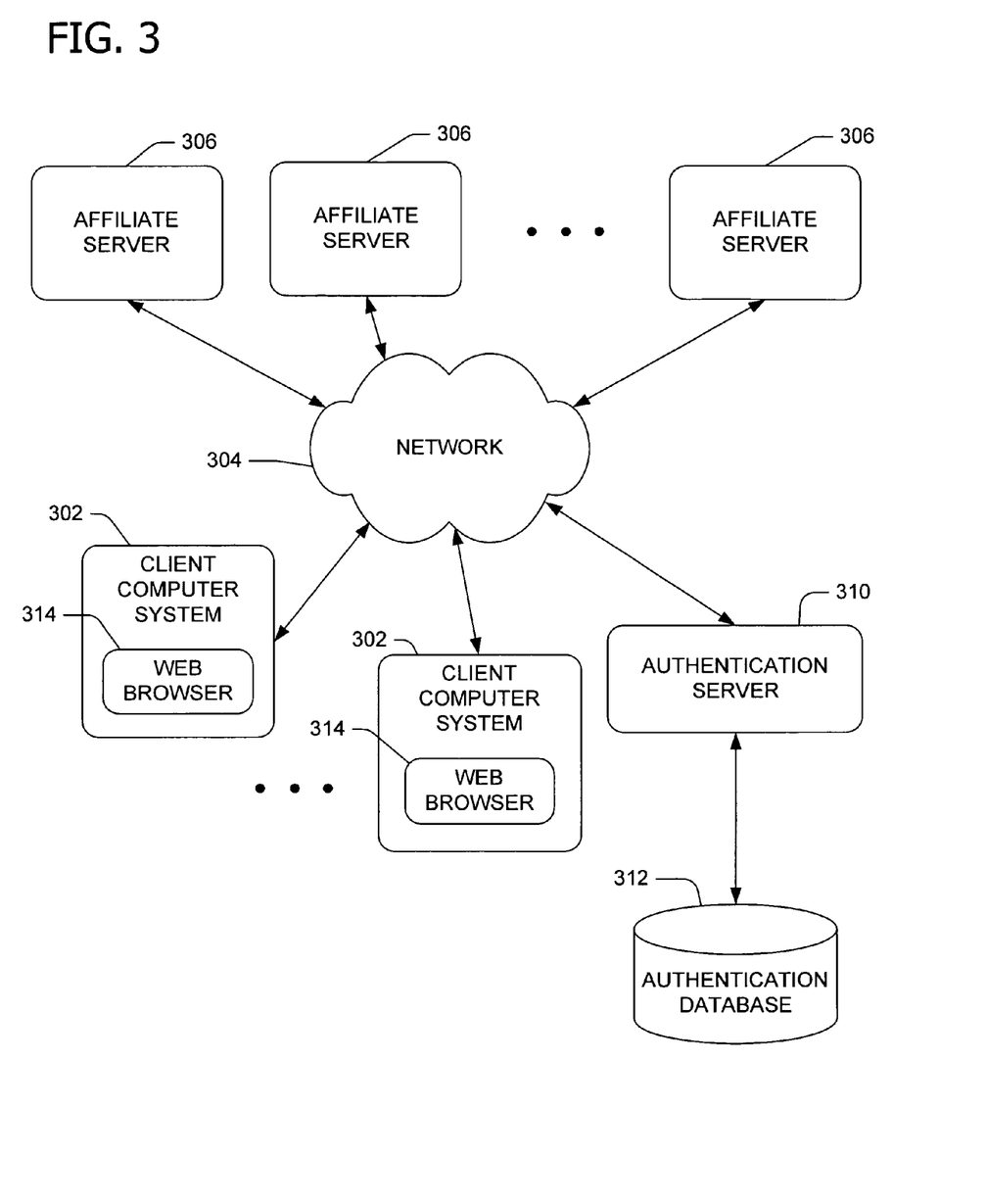
FIG. 3 is a block diagram illustrating one example of a suitable network environment in which the invention may be implemented.

According to an embodiment of the invention, the affiliated site dynamically inserts its own branding elements and/or messaging with the centralized pages via hyperlinks, which may include authentication interfaces, provided by the multi-site user authentication system. This may also include areas, such as textboxes, where the user can interact with the user interface (UI), and it may also include hidden elements, and/or code that the user does not see directly, but is used to communicate with the central system. For example, the central server content includes centralized registration, sign in, express purchase service pages, and the like. The affiliate site preferably specifies many aspects of the layout and content of the central network pages, with the exception of specific UI areas designated for use by the central pages. For example, specific UI areas are set aside to display forms used for the actual sign-in or registration process. Although described herein in connection with service cobranding in a multi-site user authentication system such as illustrated in FIG. 3, it is to be understood that the present invention is suitable for use in any number of environments. Centralized network environments generally benefit from aspects of the invention, allowing a distributed set of affiliate sites to aggregate content through the client browser as if it were a single site (or page). Thus, the invention provides a powerful tool for quickly building highly dynamic content without burdening the aggregating site with the cost of supporting the bandwidth required for serving the content.

Exemplary Network Environment

Referring next to FIG. 3, a block diagram illustrates one example of a suitable network environment in which the invention may be implemented. FIG. 3 illustrates an exemplary network environment in which the present invention is utilized. The invention relates to cross-network collaboration between web sites as part of a distributed, multi-site user authentication system. Such services provide a user with the ability to access one or more participating web sites or resources with a single sign-in. Although the participating, or affiliate, sites still maintain control over permissions, they use the authentication service rather than hosting and maintaining their own proprietary authentication systems. Although the invention is described in terms of a multi-site user authentication system, the invention is operable with any type and number of authentication systems.

In FIG. 3, one or more client computer systems 302 are coupled to a data communication network 304. In this example, the network 304 is the Internet (e.g., supporting the World Wide Web). However, the teachings of the present invention can be applied to any data communication network. Multiple affiliate servers 306 are also coupled to network 304. In turn, the client computer systems 302 can access the affiliate servers 306 via network 304. Affiliate servers 306 are also referred to as web servers or network servers.

Although authentication database 312 is shown separately from authentication server 310, it is to be understood that in other embodiments of the invention, authentication database 312 may be contained within authentication server 310. In a federated environment, for example, a plurality of authentication servers 310 may be used to provide authentication.

In one embodiment, the invention provides client aggregation of content between web sites, such as those hosted by affiliate servers 306 and by authentication server 310 as part of a distributed, multi-site user authentication system. In general, cobranding is a process by which the affiliate server 306 provides its own content to customize network pages provided by a central site such as the authentication server 310. The authentication server 310 displays pages that include both its own content and cobranded network server content from affiliate servers 306. An embodiment of the invention defines templates for each page that include cobranded content. The templates assign portion(s) of the user interface for content from the affiliate server 306 and portion(s) of the user interface for content from the authentication server 310.

Creating the Template

Figure 4:
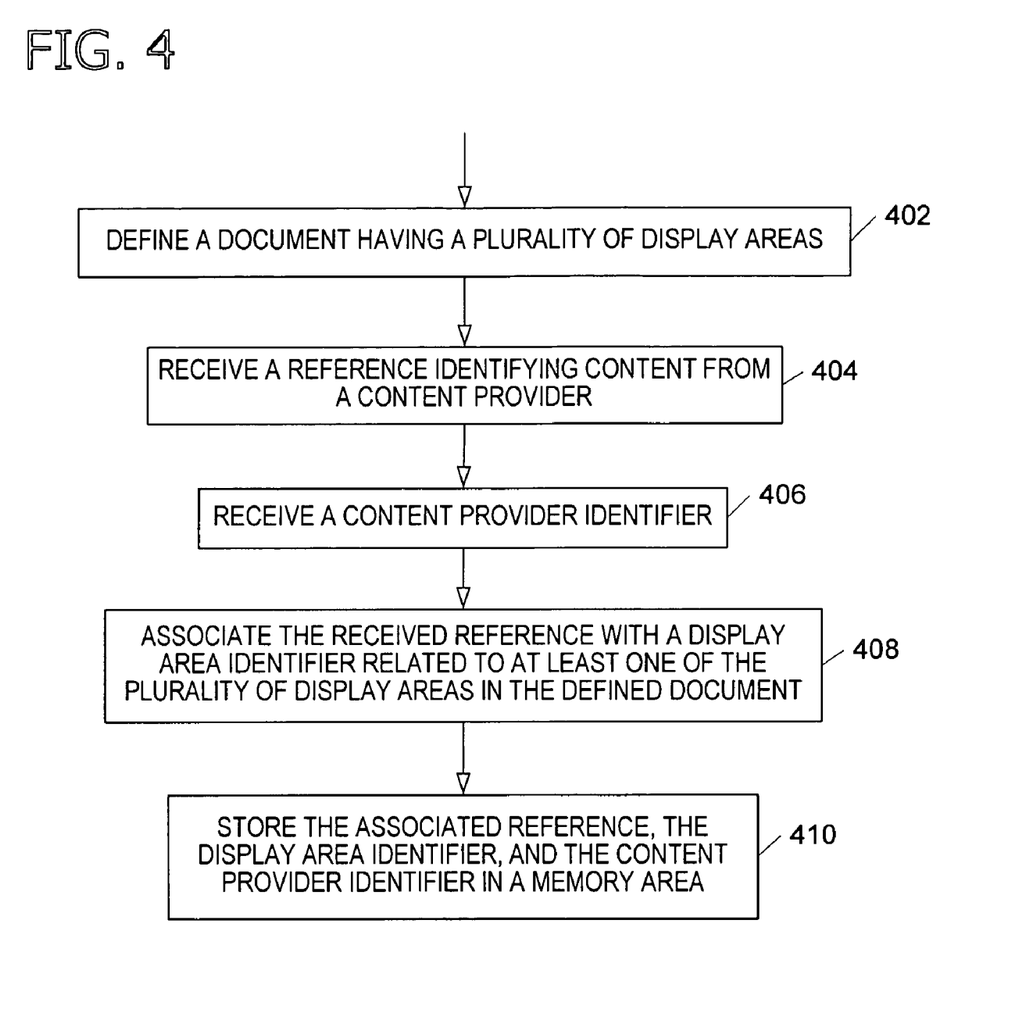
FIG. 4 is an exemplary flow chart illustrating operation of a procedure allowing a content provider to submit content references for dynamic inclusion in a template document.

Referring next to FIG. 4, an exemplary flow chart illustrates operation of a procedure allowing a content provider to submit content references for dynamic inclusion in a template document. An embodiment of the invention includes a method of enabling the dynamic aggregation of content from a plurality of content providers. In particular, the method includes defining a document (e.g., a web page) having a plurality of display areas (e.g., frames) at 402. Defining includes specifying the size and positioning of each of the display areas as well as assigning a display area identifier (e.g., a string HTML ID) to each display area. In one implementation, an automated tool enables design and creation of this document as well as template files for each of the display areas. The defined document acts as a centralized web page in which portions (e.g., the display areas) are specified to receive content (e.g., a logo) from a participating affiliate server.

In one embodiment, the frames are adjacent. In other embodiments, the frames exhibit overlap or space exists between the frames. In a web browser embodiment, the frames are rectangular. In other embodiments, the frames take the form of other shapes as supported by the particular markup language implementing the invention.

The method further includes receiving at least one reference from at least one content provider at 404. In one embodiment, the method includes receiving content from a plurality of content providers. The received reference, or set of references, identifies content hosted by an affiliate server. The affiliate server updates or modifies the content. In one embodiment, the reference is a hyperlink comprising a network address such as a uniform resource locator (URL). In one example, the affiliate server may also provide cascading style sheets (CSS) to modify the appearance of the HTML in the affiliate display areas on the defined document at a style level as desired by the affiliate servers. The CSS file allows the affiliate server to change basic style elements such as text colors, fonts, and vertical spacing between paragraphs for the display areas associated with the affiliate. In one example, the CSS URL that is registered with the invention may also have query string parameters added to it thus allowing the affiliate server to dynamically change the styles defined by the cascading style sheet. In addition, the affiliate server may supply some CSS attributes to modify the style of the display areas associated with the central site. These attributes are "safe" attributes including, but not limited to, font type, font size, and color. Responsive to a request from the affiliate server, an embodiment of the invention automatically generates an inline CSS on the fly based on the information that the affiliate server has provided. This improves security by ensuring that the content provided by the affiliate server is safe to include within the document.

An affiliate sets the style for the display areas associated with the affiliate by providing the content (e.g., HTML) for the display areas. However, the content provided by the affiliate does not influence the style for the display areas associated with the central site. Instead, the affiliate may express various preferences such as frame sizes, positioning, z-index, and customizable attributes for the display areas provided by the central site. For example, the affiliate may ask the central site to use a font consistent with the affiliate's content. The preferences (along with the references for each display area) are expressed in a file such as shown below. In the example below, the file is an XML document provided to the central site by the affiliate server during setup. The central site stores the preferences including the references. A portion of an exemplary XML document specifying preferences is shown below:

```
<LayOut ident="Login">
    <TopLevel>Design#1</TopLevel>
    <FrameSrc name="Header">
        http://pageA.net/welcome
    </FrameSrc>
</LayOut>
```

The method also includes receiving a content provider identifier associated with the content provider at 406. The method further includes associating the received reference with a display area identifier related to at least one of the plurality of display areas in the defined document at 408. The method also includes storing the associated reference, the display area identifier, and the content provider identifier in a memory area such as a database at 410.

When the affiliate server redirects the user to the defined document (e.g., hosted by another web server such as an authentication server), the affiliate server identifies a set of references stored in the memory area (e.g., through the user of query string parameters). The defined document is populated with the identified set of references. The user's web browser or other user interface operates to retrieve the content specified by the set of references (see FIG. 5).

For example, an XML document populated with the references specific to the affiliate server may appear as follows:

```
<HTML>
    <FRAME src= http://pageA.net/welcome>
    <FRAME src= http://pageB.net/header?cb=...>
    ...
</HTML>
```

In a particular embodiment, the method includes defining a web page having a plurality of frames and receiving a hyperlink from a content provider. The hyperlink identifies content associated with the content provider. The method also includes associating the received hyperlink with a frame identifier related to one of the plurality of frames in the defined web page. The method includes storing the associated hyperlink, the frame identifier, and the content provider identifier in a memory area.

One or more computer-readable media have computer-executable instructions for performing the method illustrated in FIG. 4.

Dynamically Creating the Document

Figure 5:
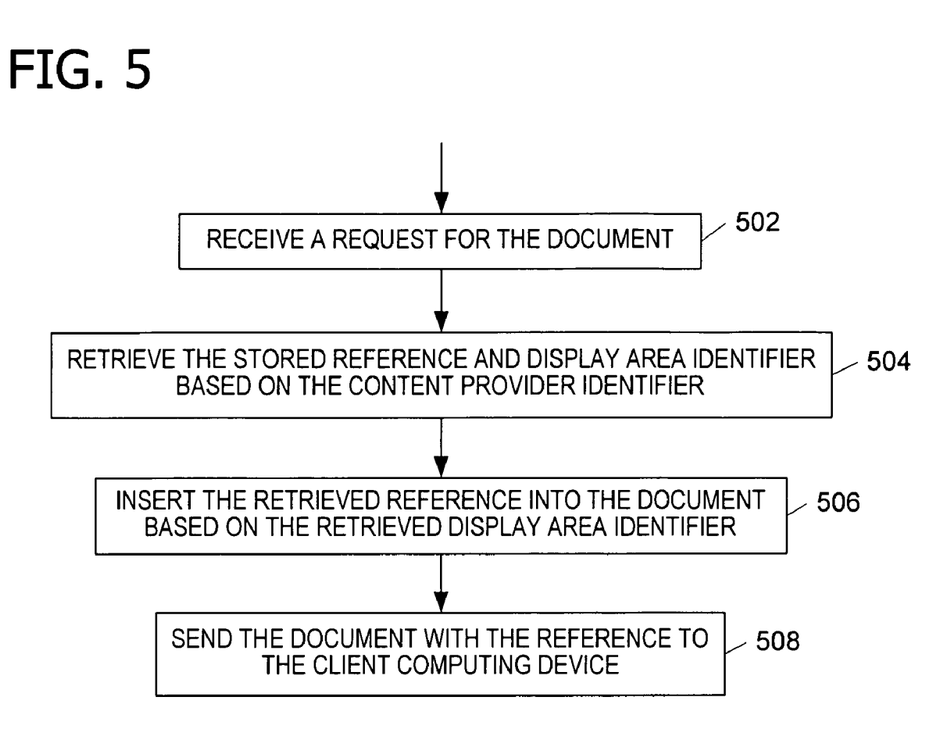
FIG. 5 is an exemplary flow diagram describing the dynamic aggregation of content from multiple content providers into a single document.

Referring next to FIG. 5, an exemplary flow diagram describes the dynamic aggregation of content from multiple content providers into a single document. In general, the method includes receiving a request for the document at 502. The request comprises the content provider identifier. Responsive to the received request, the method includes retrieving the stored reference and display area identifier based on the content provider identifier at 504. The method also includes inserting the retrieved reference into the document based on the retrieved display area identifier at 506. The method further includes sending the document with the reference to a client computing device at 508. An application program (e.g., a web browser) executing on the client computing device renders the document with the reference by retrieving the content from the content provider via the reference and displaying the retrieved content in the display area identified by the display area identifier. In an alternative embodiment, the method sends the document to the content provider for delivery to the client computing device.

One or more computer-readable media have computer-executable instructions for performing the method illustrated in FIG. 5.

Figure 6:
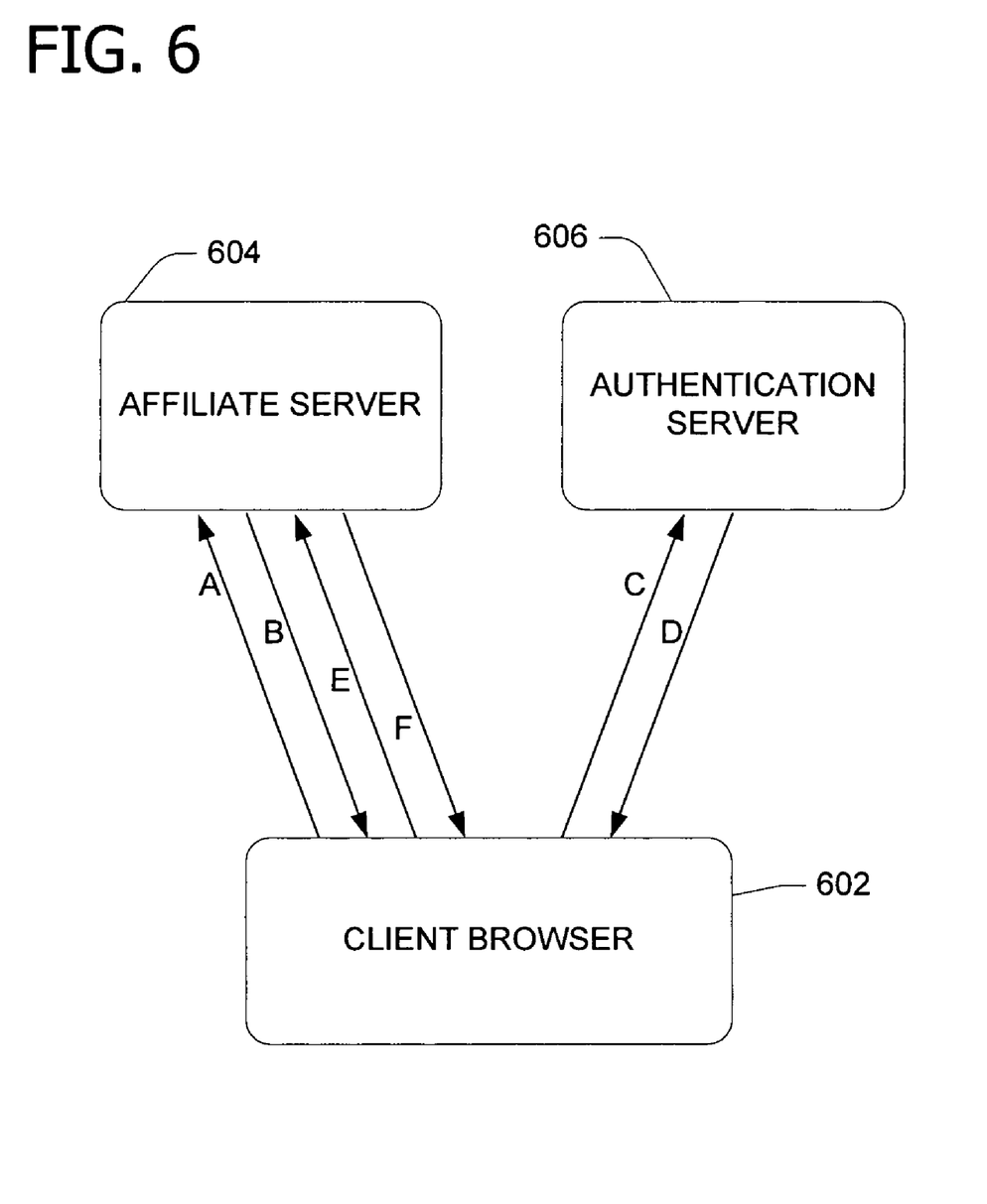
FIG. 6 is an exemplary flow diagram illustrating the interaction between a client computer, an affiliate server, and an authentication server when a user of the client computer seeks access to the affiliate server.

Referring next to FIG. 6, an exemplary flow diagram illustrates the interaction between a client computer such as client computer 302 executing a client web browser 602, an affiliate server 604 such as affiliate server 306, and an authentication server 606 such as authentication server 310 when a user of the client computer seeks access to the affiliate server 604. According to the invention, the affiliate server 604 registers information with the authentication server 606 prior to the process flow shown in FIG. 6 to permit the authentication server 606 to obtain the branding content desired by the affiliate server 604. The lines in FIG. 6 labeled "A" through "F" represent the flow of information or activities during the cobranding process. The arrows on the lines indicate the direction of the process flow. The label "A" represents the beginning of the process and the label "F" represents the end of the process. In an embodiment, process flows indicated by lines B-F occur sequentially in a single page render to the client browser 602 resulting from the process flow indicated by line A.

In the exemplary process flow of FIG. 6, the user of the client browser 602 seeks access to the affiliate server 604. In this example, the user initiates an HTTP GET command to a selected site hosted by the affiliate server 604 (see flow indicated by reference character A in FIG. 6). The affiliate server 604 redirects the client browser 602 to a centralized page at the authentication server 606 via an HTTP or HTTPS link. In an embodiment of the invention, the link includes the keywords ID={registered affiliate identification} and CB={callback string given to client to allow cobranding at page level}. During registration, the affiliate server 604 provided the authentication server 606 (or other server) with references linked to content provided by the affiliate server 604. The authentication server 606 previously stored the references using an identifier associated with the affiliate server 604 as an index to later retrieve the references.

The affiliate server 604 redirects the client browser 602 to the authentication server 606 with the CB query string parameter set to a chosen string or character value, passing this information as strings in the URL. (See B). The client browser 602 responds by issuing an HTTP or HTTPS GET command to the authentication server 606. (See C). The authentication server 606 uses the ID keyword for the particular affiliate server 604 to look up the references stored by the authentication server 606 (or other server). The authentication server 606 performs a lookup based on the value of the incoming ID=keyword on the query string to obtain the references stored for the affiliate server 604. The authentication server 606 dynamically inserts the stored references into a web page and delivers the dynamically created web page to the client browser 602. (See D). When rendering the web page received from the authentication server 606, the client browser 602 downloads content (e.g., from the affiliate server 604) associated with the references in the web page. (See E and F).

This technique provides the impression that the page is fully rendered by the affiliate server 604 when portions are actually rendered by the authentication server 606. Moreover, the central site need not host all cobranding elements for every affiliate server 604, which reduces its infrastructure needs.

Exemplary System Structure

Figure 7:
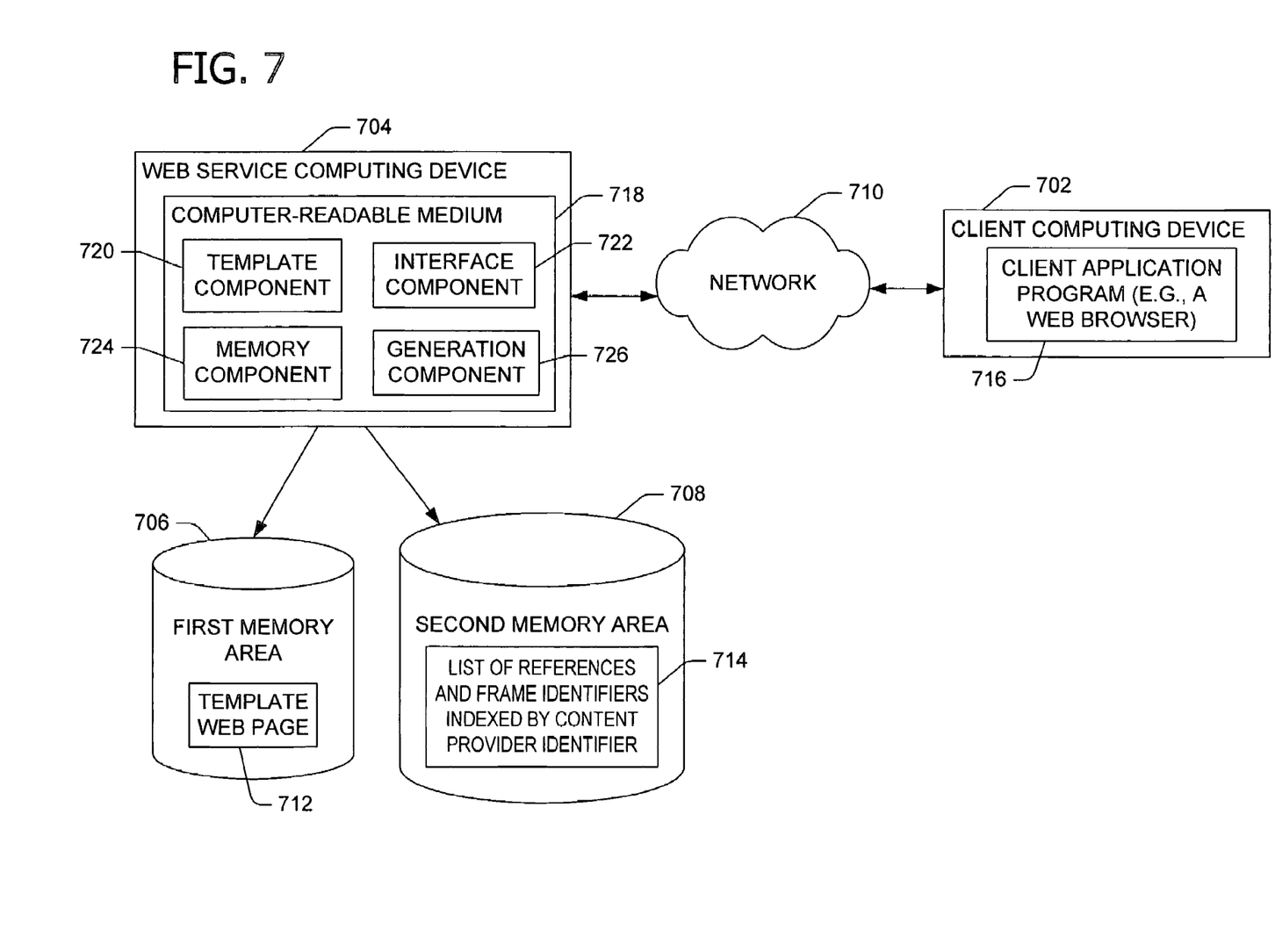
FIG. 7 is a block diagram illustrating the relationships between a client computing device, a web service computing device, and memory areas for implementing the invention.

Referring next to FIG. 7, a block diagram illustrates the relationships between a client computing device 702, a web service computing device 704, and memory areas 706, 708 for implementing the invention. The components illustrated in FIG. 7 may be located on one computer-readable medium and/or computing device. Alternatively, the components may be distributed across any quantity of computer-readable media and/or computing devices communicating via a network 710.

The exemplary system of FIG. 7 enables the dynamic aggregation of content from a plurality of content providers.

The system includes a first memory area 706, a second memory area 708, the web service computing device 704, and the client computing device 702. The first memory area 706 stores a document (e.g., a template web page 712) defining a plurality of display areas. The second memory area 708 stores a list 714 or plurality of references and associated frame identifiers. The references each identify content associated with a content provider. Each of the plurality of references is associated with one of the plurality of display areas via the frame identifiers in the document stored by the first memory area 706. In one embodiment, the second memory area 708 stores a list of the references and frame identifiers indexed by content provider identifier. The first memory area 706 and the second memory area 708 may be the same or different databases and may be located within the same or different computer-readable media.

The web service computing device 704 dynamically inserts each of the plurality of references stored in the second memory area 708 into the associated display area of the document stored in the first memory area 706 responsive to a request for the document from the client computing device 702. The web service computing device 704 sends the document with the references to the client computing device 702. The client computing device 702 includes a client application program 716 (e.g., a web browser) executing to render the document received from the web service computing device 704 by retrieving content via the references.

In one embodiment, the web service computing device 704 has associated therewith at least one computer-readable medium 718 having computer-executable components for enabling the dynamic aggregation of content from a plurality of content providers. The components include a template component 720, an interface component 722, a memory component 724, and a generation component 726. The template component 720 defines the document (e.g., the template web page 712) with the plurality of display areas and stores the document in a memory area such as the first memory area 706. The interface component 722 receives a reference from a content provider and associates the received reference with a display area identifier related to at least one of the plurality of display areas in the document defined by the template component 720. The memory component 724 stores the reference, the display area identifier, and the content provider identifier in a memory area such as the second memory area 708.

The interface component 722 further receives a request for the document. The request includes a content provider identifier. The memory component 724, responsive to the request received by the interface component 722, retrieves the stored reference and display area identifier from the second memory area 708 based on the content provider identifier. The generation component 726 inserts the reference retrieved by the memory component 724 into the document based on the display area identifier retrieved by the memory component 724. The interface component 722 sends the document with the reference inserted by the generation component 726 to the client computing device 702. An application program executing on the client computing device 702 renders the document with the reference by retrieving the content from the content provider via the reference and displaying the retrieved content in the display area identified by the display area identifier.

Exemplary Operating Environment

Figure 8:
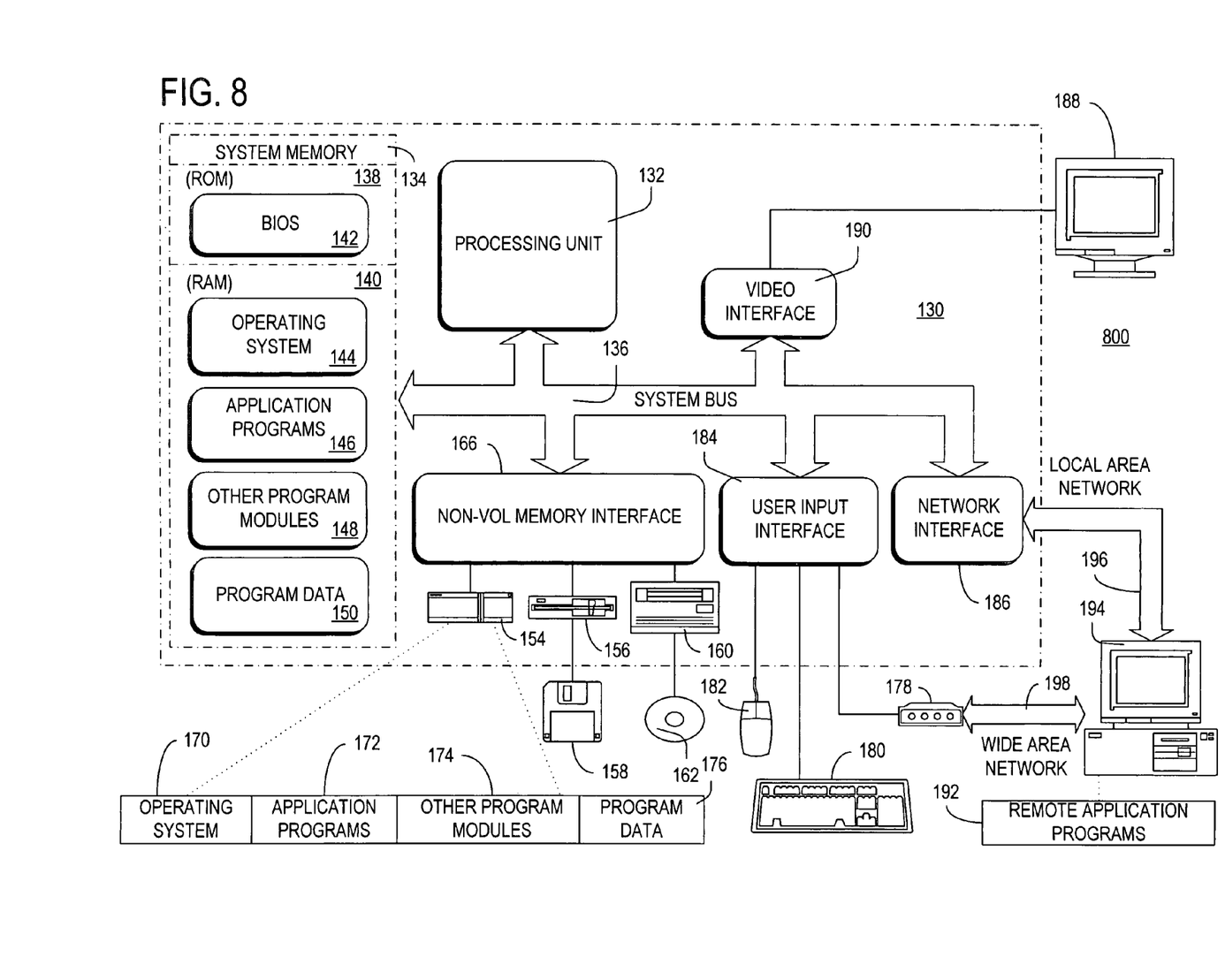
FIG. 8 is a block diagram illustrating one example of a suitable computing system environment in which the invention may be implemented.

FIG. 8 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 8 illustrates operating system 144, application programs 146, other program modules 148, and program data 150.

The computer 130 may also include other removable/non-removable, volatile/nonvolatile computer storage media. For example, FIG. 8 illustrates a hard disk drive 154 that reads from or writes to non-removable, nonvolatile magnetic media. FIG. 8 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 8, provide storage of computer readable instructions, data structures, program modules and other data for the computer 130. In FIG. 8, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 8 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 8 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 130 executes computer-executable instructions such as those illustrated in FIG. 4 and FIG. 5 to implement the invention.

While the invention is described with reference to authentication and cobranding, the invention is limited to neither. The invention is applicable to any environment in which content is aggregated from multiple content providers into separate display areas in a single document. The display areas have certain properties as described herein. For example, one implementation of the invention uses frames in a web browser as supported by a hypertext markup language (HTML), but other implementations may use other features of other markup languages not specifically described herein.

Further, the client through which the content is communicated to the user may be a computing device such as computer 130, an application program, or both. Any clients exhibiting content separation properties such as those associated with web browser frames are suitable for use with the invention. Exemplary clients include a cellular telephone (e.g., a smartphone device), a pager, and a handheld computing device (e.g., a personal digital assistant or a Pocket PC device). Further, the client may include any of the above exemplary devices enabled with an information service such as a SMART PERSONAL OBJECTS TECHNOLOGY (SPOT) brand of telecommunication service and/or devices. The information service comprises a computing infrastructure (e.g., a telecommunication service) for sending data and information to personal and home devices via computer networks, wireless networks and the Internet. The clients which may be enabled with the information service include, but are not limited to, the following devices: clocks, alarm clocks, radios incorporating clocks, watches, billfolds, wallets, checkbook and passbook wallets, purses, pens, metal key rings, key holders, wireless devices, computer hardware (e.g., peripherals, monitors, and displays), electronic calendar devices, and refrigerator magnets. Further, magazines, books, and user manuals relating to computers, computer programs, personal information devices and wireless communications may also incorporate the information service. The information service enables billions of devices to communicate with each other. For example, customers select the type of information and services they want to receive on the enabled devices via a configuration web page. This content is subsequently beamed to and displayed on the device. Information available to users on devices using the information service includes personal messages, calendar updates, and customized news, weather, financial and sports information.

The order of execution or performance of the methods illustrated and described herein is not essential, unless otherwise specified. That is, elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method of enabling dynamic aggregation of content from a plurality of content providers, said method comprising:
    defining a template having a plurality of display areas;
    receiving a reference from a content provider, said reference identifying content hosted by the content provider, said content provider having a content provider identifier associated therewith;
    associating the received reference with a display area identifier related to at least one of the plurality of display areas in the defined template;
    creating a document from the defined template;
    associating the associated reference, the display area identifier, and the content provider identifier with the created document;
    storing the created document in a memory area;
    receiving a request for the document, said request comprising the content provider identifier;
    responsive to the received request, retrieving the stored reference and display area identifier based on the content provider identifier;
    inserting the retrieved reference into the document based on the retrieved display area identifier; and
    sending the document with the reference to a client computing device, wherein an application program executing on the client computing device then dynamically renders, without input from a user, the document to the user by retrieving the content from the content provider via the reference and displaying the retrieved content in the display area identified by the display area identifier.

2. The method of claim 1, further comprising sending the document with the reference to the content provider.

3. The method of claim 1, wherein defining the template having the plurality of display areas comprises defining a web page having a plurality of frames.

4. The method of claim 3, wherein receiving the reference from the content provider comprises receiving a hyperlink from the content provider.

5. The method of claim 1, wherein one or more computer-readable media have computer-executable instructions for performing the method recited in claim 1.

6. The method of claim 1, wherein receiving the reference from the content provider comprises receiving only the reference from the content provider.

7. The method of claim 1, wherein associating the received reference with the display area identifier related to the at least one of the plurality of display areas in the defined template comprises associating only the received reference with the display area identifier related to the at least one of the plurality of display areas in the defined template.

8. The method of claim 1, wherein associating the associated reference, the display area identifier, and the content provider identifier with the created document comprises associating only the associated reference, the display area identifier, and the content provider identifier with the created document.

9. The method of claim 1, wherein inserting the retrieved reference into the document based on the retrieved display area identifier comprises inserting only the retrieved reference into the document based on the retrieved display area identifier.

10. The method of claim 1, wherein the application program executing on the client computing device then dynamically renders, without input from the user, the document to the user by retrieving the content from the content provider via the reference and displaying only the retrieved content in the display area identified by the display area identifier.

11. The method of claim 1, wherein receiving the reference from the content provider comprises receiving, from the content provider, the reference without receiving the content identified by the reference.

12. The method of claim 1, wherein the content is retrieved by the application program after said sending the document.

13. A method of enabling dynamic aggregation of content from a plurality of content providers, said method comprising:

defining a template document having a plurality of frames;

receiving a hyperlink from a content provider, said hyperlink identifying content hosted by the content provider, said content provider having a content provider identifier associated therewith;

associating the received hyperlink with a frame identifier related to one of the plurality of frames in the defined template document;

creating a web page from the defined template document;

associating the associated hyperlink, the frame identifier, and the content provider identifier with the created web page;

storing the created web page in a memory area;

receiving a request for the web page, said request comprising the content provider identifier;

responsive to the received request, retrieving the stored hyperlink and frame identifier based on the content provider identifier;

inserting the retrieved hyperlink into the web page based on the retrieved frame identifier; and sending the web page with the hyperlink to a client computing device, wherein a web browser executing on the client computing device then dynamically renders, without input from a user, the web page to the user by downloading the content from the content provider via the hyperlink and displaying the downloaded content in the frame identified by the frame identifier.

14. The method of claim 13, wherein receiving the request comprises receiving a dynamic uniform resource locator having the content provider identifier as a query string parameter.

15. The method of claim 13, further comprising sending the web page with the hyperlink to the content provider.

16. The method of claim 13, wherein defining the template document comprises defining the template document using a hypertext markup language.

17. The method of claim 8, wherein one or more computer-readable media have computer-executable instructions for performing the method recited in claim 13.

18. One or more computer-readable media having computer-executable components for enabling dynamic aggregation of content from a plurality of content providers, said components comprising:

a template component to define a template having a plurality of display areas;

an interface component to receive a reference from a content provider, said reference identifying content hosted by the content provider, said content provider having a content provider identifier associated therewith, said interface component further adapted to associate the received reference with a display area identifier related to at least one of the plurality of display areas in the template defined by the template component;

a memory component to create a document from the template defined by the template component, and to store the reference, the display area identifier, and the content provider identifier with the created document in a memory area, wherein the interface component is further adapted to receive a request for the document, said request comprising the content provider identifier, wherein the memory component, responsive to the request received by the interface component, is further adapted to retrieve the stored reference and display area identifier based on the content provider identifier; and a generation component to insert the reference retrieved by the memory component into the document based on the display area identifier retrieved by the memory component, wherein the interface component is further adapted to send the document with the reference inserted by the generation component to a client computing device, wherein an application program executing on the client computing device then dynamically renders, without input from a user, the document to the user by retrieving the content from the content provider via the reference and displaying the retrieved content in the display area identified by the display area identifier.

19. The computer-readable media of claim 18, wherein the template component is further adapted to define a web page having a plurality of frames.

20. The computer-readable media of claim 18, wherein the interface component is further adapted to receive a hyperlink from the content provider.

21. A system for enabling dynamic aggregation of content from a plurality of content providers, said system comprising:

a first memory area to store a template defining a plurality of display areas;

a second memory area to store a plurality of references each identifying content hosted by a content provider, wherein each of the plurality of references is associated with one of the plurality of display areas in the template stored in the first memory area; and a computing device to create a document from the template stored in the first memory area and to dynamically insert each of the plurality of references stored in the second memory area into the associated display area of the created document responsive to a request for the document, wherein the computing device is further adapted to send the document with the plurality of references to a client application program responsive to a request from a user for the document, wherein the client application program then executes to dynamically retrieve the content via the references and to render, without input from the user, the content in the document to the user.

22. The system of claim 21, wherein the document comprises a web page, wherein each of the references comprises a hyperlink, and wherein each of the display areas comprises a frame.

23. The system of claim 21, wherein one of the plurality of references comprises a reference to a user authentication service.

24. The system of claim 21, wherein each of the plurality of references identifies content from a different content provider.

25. The system of claim 21, wherein the content identifies the content provider associated therewith.

26. The system of claim 21, wherein the content comprises one or more of the following: text, graphics, audio, and video.

27. A web service for cobranding a login user interface, said web service comprising:

a template document defining a plurality of frames;

a plurality of hyperlinks each identifying content hosted by a content provider, wherein each of the plurality of hyperlinks is associated with one of the plurality of frames defined in the template document, wherein the content for one of the plurality of hyperlinks includes a user name text box and a password text box; and computer-executable instructions to dynamically create a web page from the defined template document and to insert each of the plurality of hyperlinks into the associated frame in the created web page responsive to a request for the web page, wherein the computer-executable instructions, when executed, send the created web page to a client computing device responsive to a request for the web page from a user, and wherein the client computing device, without input from the user, then dynamically retrieves the content identified by each of the hyperlinks and renders the retrieved content in the associated frames in the web page.

28. The web service of claim 27, wherein the client comprises an application program or a computing device or both.

29. The web service of claim 27, further comprising another plurality of hyperlinks each identifying content associated with another content provider, and wherein the computer-executable instructions execute, responsive to a request from the another content provider, to dynamically create another web page from the defined template document and to retrieve the another plurality of hyperlinks and to insert the retrieved another plurality of hyperlinks into the associated frames in the another web page.

* * * * *